United States Patent [19]

Ishikawa

[11] Patent Number: 5,063,530

[45] Date of Patent: Nov. 5, 1991

[54] METHOD OF ADDING/SUBTRACTING FLOATING-POINT REPRESENTATION DATA AND APPARATUS FOR THE SAME

[75] Inventor: Tadashi Ishikawa, Tokyo, Japan

[73] Assignee: Kabushiki Kaisha Toshiba, Kawasaki, Japan

[21] Appl. No.: 359,145

[22] Filed: May 31, 1989

[30] Foreign Application Priority Data

May 31, 1988 [JP] Japan ................................ 63-132977

[51] Int. Cl.$^5$ .............................................. G06F 7/38
[52] U.S. Cl. ...................................................... 364/748
[58] Field of Search .............................. 364/748, 768

[56] References Cited

U.S. PATENT DOCUMENTS 4,488,252 12/1984 Vassar ................................. 364/748
4,562,553 12/1985 Mattedi et al. ..................... 364/748
4,796,218 1/1989 Tanaka et al. ...................... 364/748
4,849,921 7/1989 Yasumoto et al. .................. 364/768
4,849,923 7/1989 Samudrala et al. ................. 364/748
4,896,286 1/1990 Ueda ................................... 364/748

Primary Examiner—Dale M. Shaw
Attorney, Agent, or Firm—Cushman, Darby & Cushman

[57] ABSTRACT

A floating-point representation data adding/subtracting apparatus includes first and second adder/subtracter for performing operations of a first mantissa part of first operation data having a larger exponential part and a second mantissa part of second operation data having a smaller exponential part. The first and second adder/subtracter simultaneously execute the operations. One of the operation results of the first and second adder/subtracters is selected as a correct mantissa part operation result.

6 Claims, 5 Drawing Sheets

| SIGN OF DATA A | SIGN OF DATA B | M | RELATION | MODE | EXPECTION SIGN |
|---|---|---|---|---|---|
| +,0 | +,0 | + | A ≧ B | + | 0 |
|     |     |   | A < B  |   | 0 |
| +,0 | −   | + | A ≧ B | − | 0 |
|     |     |   | A < B |   | 1 |
| −   | +,0 | + | A ≧ B | − | 1 |
|     |     |   | A < B |   | 0 |
| −   | −   | + | A ≧ B | + | 1 |
|     |     |   | A < B |   | 1 |
| +,0 | +,0 | − | A ≧ B | − | 0 |
|     |     |   | A < B |   | 1 |
| +,0 | −   | − | A ≧ B | + | 0 |
|     |     |   | A < B |   | 0 |
| −   | +,0 | − | A ≧ B | + | 1 |
|     |     |   | A < B |   | 1 |
| −   | −   | − | A ≧ B | − | 1 |
|     |     |   | A < B |   | 0 |

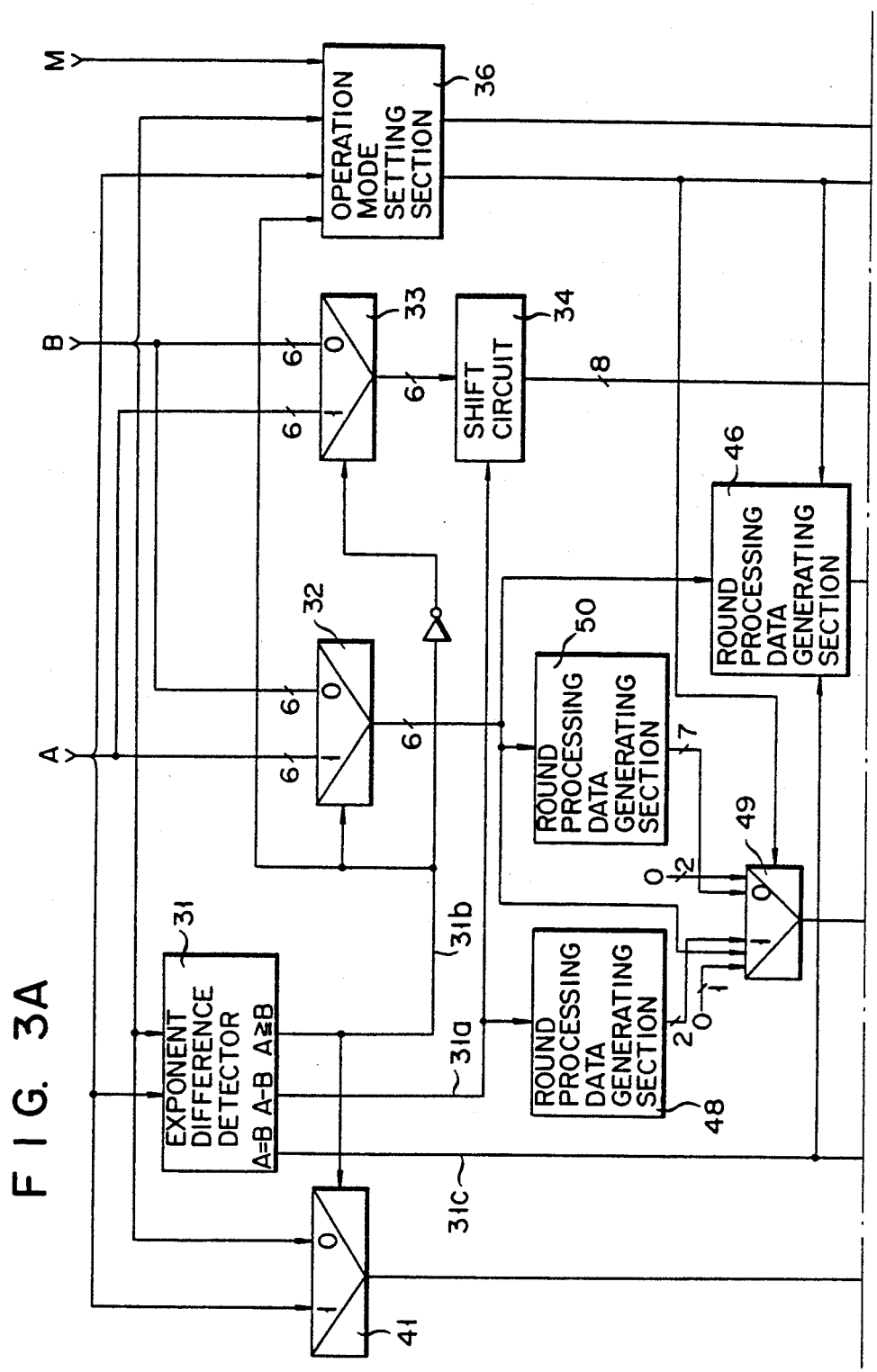
F I G. 3A

```
          45:ROUNDING                    35:ROUNDING
OTH DIGIT=1  ↓              OTH DIGIT=0    ↓
    |X X X X X Y|O O (L)        |X X X X X|8 O (L)
 +  |X X X X X X|O O (R)     +  |X X X X X X|X X (R)
    ─────────────────            ─────────────────
   1|X X X X X X|X X           O|X X X X X X|X X
          Y=X+8H
```

F I G. 5A            F I G. 5B

```
    |X X X X X X|O O (L)        |X X X X X X|O O (L)
 -  |X X X X X X|O O (R)     -  |X X X X X X|O O (R)
    ─────────────────            ─────────────────
   O|X X X X X X|O O           O|X X X X X X|O O
```

F I G. 5C            F I G. 5D

```
                                           35:ROUNDING
1ST DIGIT = 0                1ST DIGIT ≠ 0    ↓
    |X X X X X X|O O (L)        |X X X X X X|8 O (L)
 -  |O X X X X X|X O (R)     -  |O X X X X X|X O (R)
    ─────────────────            ─────────────────
   O|O X X X X X|X O           O|X X X X X X|X O
```

F I G. 5E            F I G. 5F

```
              45:ROUNDING                  35:ROUNDING
1ST DIGIT = 0    ↓            1ST DIGIT ≠ 0    ↓
    |X X X X X|O 8 (L)           |X X X X X X|8 O (L)
 -  |O O X X X X|X X (R)      -  |O O X X X X|X X (R)
    ─────────────────             ─────────────────
   O|O X X X X X|X X            O|X X X X X X|X X
```

F I G. 5G            F I G. 5H

METHOD OF ADDING/SUBTRACTING FLOATING-POINT REPRESENTATION DATA AND APPARATUS FOR THE SAME

BACKGROUND OF THE INVENTION

1. Field of the Invention

The present invention relates to a method of adding/subtracting floating-point representation data suitable for a computer or a digital signal processor and an apparatus therefor.

2. Description of the Related Art

Floating-point representation data is generally expressed by a format shown in FIG. 2. Referring to FIG. 2, bit 0 represents a sign of the data. That is, bit O of "0" represents the positive polarity or 0, and bit O of "1" represents the negative polarity. Bits 1 to 7 represent an exponential part of the data in units of for bits of the mantissa port, and an offset is 40H. In this case a suffix H represents hexadecimal notation. Bits 8 to 31 in the case of single precision and bits 8 to 63 in the case of double precision represent a mantissa part of the data. Since the mantissa part is normally expressed in units of four bits, i.e., in hexadecimal notation, it has six digits in the case of single precision and 14 digits in the case of double precision. Normalization is performed in units of digits assuming that a floating-point is located to the left of bit 8. That is, in data except for 0, one of bits 9 to 11 always represents 1.

An apparatus for performing addition/subtraction of the floating-point representation data having the format shown in FIG. 2 is conventionally arranged as shown in FIG. 1. Referring to FIG. 1, operation data A and B and an operation instruction M indicating which of operations (A+B) and (A−B) is to be executed are supplied to the apparatus. When data to be operated is supplied, an exponent difference detector 11 operates a difference between exponential parts of the data A and B, thereby determining which of the exponential parts of the data A and B is larger. In accordance with the determination result, a multiplexer 12 selects a mantissa part of operation data having a larger exponential part, and a multiplexer 13 selects a mantissa part of operation data having a smaller exponential part. When the exponential parts are equal to each other, selection is performed assuming that A>B. A shift circuit 14 shifts the mantissa part of the operation data having the smaller exponential part selected by the multiplexer 13 to the right by the number of digits corresponding to the difference between the exponential parts operated by the detector 11. As a result, the mantissa part of the operation data having the smaller exponential part is shifted with respect to the mantissa part of the operation data having the larger exponential part.

In accordance with an operation mode, an adder/subtracter 15 performs addition or subtraction between an output from the multiplexer 12, i.e., the mantissa part of the operation data having the larger exponential part and an output from the shift circuit 14, i.e., the shifted mantissa part. The operation mode is generated from an operation mode setting section 16 on the basis of signs of the operation data A and B and the operation instruction M. In order to increase operation precision, the adder/subtracter 15 performs an operation including the digits shifted out to the right by the shift circuit 14. These extra digits in the operation are called guard digits. In addition, since a carry sometimes occurs in addition, expansion is performed to upper digits by one digit.

The operation result by the adder/subtracter 15 is supplied to the R terminal of an adder/subtracter 17 and a round controller 18. The round controller 18 controls the operation by the adder/subtracter 17 in accordance with an operation mode. That is, when the adder/subtracter 15 performs addition or when it performs subtraction and the operation result is positive, a data part corresponding to the number of digits of the mantissa part from the first digit is extracted from the output from the adder/subtracter 15, and the lowest digit is rounded. When the adder/subtracter 15 performs subtraction and the operation result is negative, the round controller 18 supplies 0 to the L terminal of the adder/subtracter 17. Under the control of the controller 18, the adder/subtracter 17 executes an operation (L−R) and returns the mantissa part to an absolute expression. An output from the adder/subtracter 17 is supplied to a leading zero detector 19, and the number of leading zero digits is counted. A shift circuit 20 shifts the output from the adder/subtracter 17 to the left by the number of leading zero digits. As a result, the mantissa part of the operation result is normalized.

An operation result of the exponential parts is obtained as follows. A multiplexer 21 selects a larger one of the exponential parts of the data A and B. The exponential part selected by the multiplexer 21 is supplied to a subtracter 22 for exponential part correction. The number of digits used to shift the mantissa part to the left in the shift circuit 20 is also supplied to the subtracter 22. The subtracter 22 subtracts the number of left-shifted digits from the exponential part. This subtraction result corresponds to the operation result of the exponential part.

A sign of the operation result is generated as follows. The operation mode setting section 16 outputs, in addition to the operation mode for the adder/subtracter 15, a sign expected as the operation result. This expection sign is supplied to a sign generator 23. The sign generator 23 generates a sign of the operation result on the basis of the expection sign and the operation mode of the adder/subtracter 17 corresponding to the positive/negative polarity of the operation result of the adder/subtracter 15 detected by the round controller 18.

In the above conventional floating-point representation data adding/subtracting apparatus, an adder/subtracter (in FIG. 1, the adder/subtracter 15) performs addition/subtraction of mantissa parts. In accordance with the operation result, another adder/subtracter (in FIG. 1, the adder/subtracter 17) performs rounding or operates an absolute value. That is, the operation is performed through the two multi-bit adder/subtracter stages and therefore requires a long period of time.

SUMMARY OF THE INVENTION

The present invention has been made in consideration of the above situation and has as its object to provide a method of performing addition/subtraction with rounding of floating-point representation data in a time corresponding to only one multi-bit mantissa part adder/subtracter stage and an apparatus therefor.

A digit position to be rounded can be classified as follows.

<Addition Mode>

In an addition mode, a digit position to be rounded is an (n+1)th digit when a 0th digit of a mantissa part addition result is 0 and is an nth digit when it is not 0.

Therefore, in the addition mode, a first adder/subtracter is caused to perform an operation including rounding of the (n+1)th digit, and at the same time a second adder/subtracter is caused to perform mantissa part addition including rounding of the nth digit. A multiplexer selects one of the operation results as a mantissa part operation result. In this manner, operations with expected rounding are simultaneously performed by the two adder/subtracters, and one of the operation results is selected, thereby performing a mantissa part operation in a time corresponding to only one adder/subtracter.

<Subtraction Mode>

In a subtraction mode, a digit position differs in accordance with a difference between the exponential parts. When the exponential part difference is 0, no rounding need be performed. At this time, the positive/negative polarity of a subtraction result is not determined until subtraction is actually performed. For this reason, when the subtraction mode is set and the exponential part difference is 0, the first adder/subtracter executes an operation (L−R) without rounding. At the same time, the second adder/subtracter executes an operation (R−L) without rounding. Thereafter, one of the operation results is selected. That is, the mantissa part operation can be performed in a time corresponding to only one adder/subtracter stage.

When the exponential part difference is 1 and a first digit of the mantissa part subtraction result is 0, no rounding need be performed. When the exponential part difference is 1 or 2 or more and the first digit of the mantissa part subtraction result is not 0, a digit position to be rounded is an (n+1)th digit. When the exponential part difference is 2 or more and the first digit of the mantissa part subtraction result is 0, a digit position to be rounded is an (n+2)th digit. Therefore, when the subtraction mode is set and the exponential part difference is 1 or 2 or more, the first adder/subtracter is caused to perform a mantissa part subtraction including rounding of the (n+1)th digit. At the same time, the second adder/subtracter is caused to perform a mantissa part subtraction without rounding when the exponential part difference is 1 and with rounding of the (n+2)th digit when the exponential part difference is 2 or more. Thereafter, one of the operation results is selected. In this manner, the operations with rounding or without rounding are performed by the two adder/subtracters, and one of the operation results is selected, thereby performing the mantissa operation in a time corresponding to only one adder/subtracter stage.

According to the present invention as described above in detail, since addition/subtraction of mantissa parts of floating-point representation data can be performed with only one adder/subtracter stage, a processing speed can be increased.

BRIEF DESCRIPTION OF THE DRAWINGS

FIGS. 3A and 3B are block diagrams showing a floating-point representation data adding/subtracting apparatus according to an embodiment of the present invention;

FIGS. 5A to 5H are schematic views for explaining a digit position to be rounded in accordance with an operation mode and an exponential part difference of operation data, in which FIGS. 5A and 5B correspond to an addition mode, FIGS. 5C and 5D correspond to a case wherein a subtraction mode is set and the exponential part difference is "0", FIGS. 5E and 5F correspond to a case wherein the subtraction mode is set and the exponential part difference is "1", and FIGS. 5G and 5H correspond to a case wherein the subtraction mode is set and the exponential part difference is "2".

DETAILED DESCRIPTION OF THE PREFERRED EMBODIMENTS

An embodiment of a floating-point representation data adding/subtracting apparatus according to the present invention will be described in detail below with reference to the accompanying drawings. In this embodiment, the present invention is applied to a single-precision adding/subtracting apparatus.

Figure 3B:
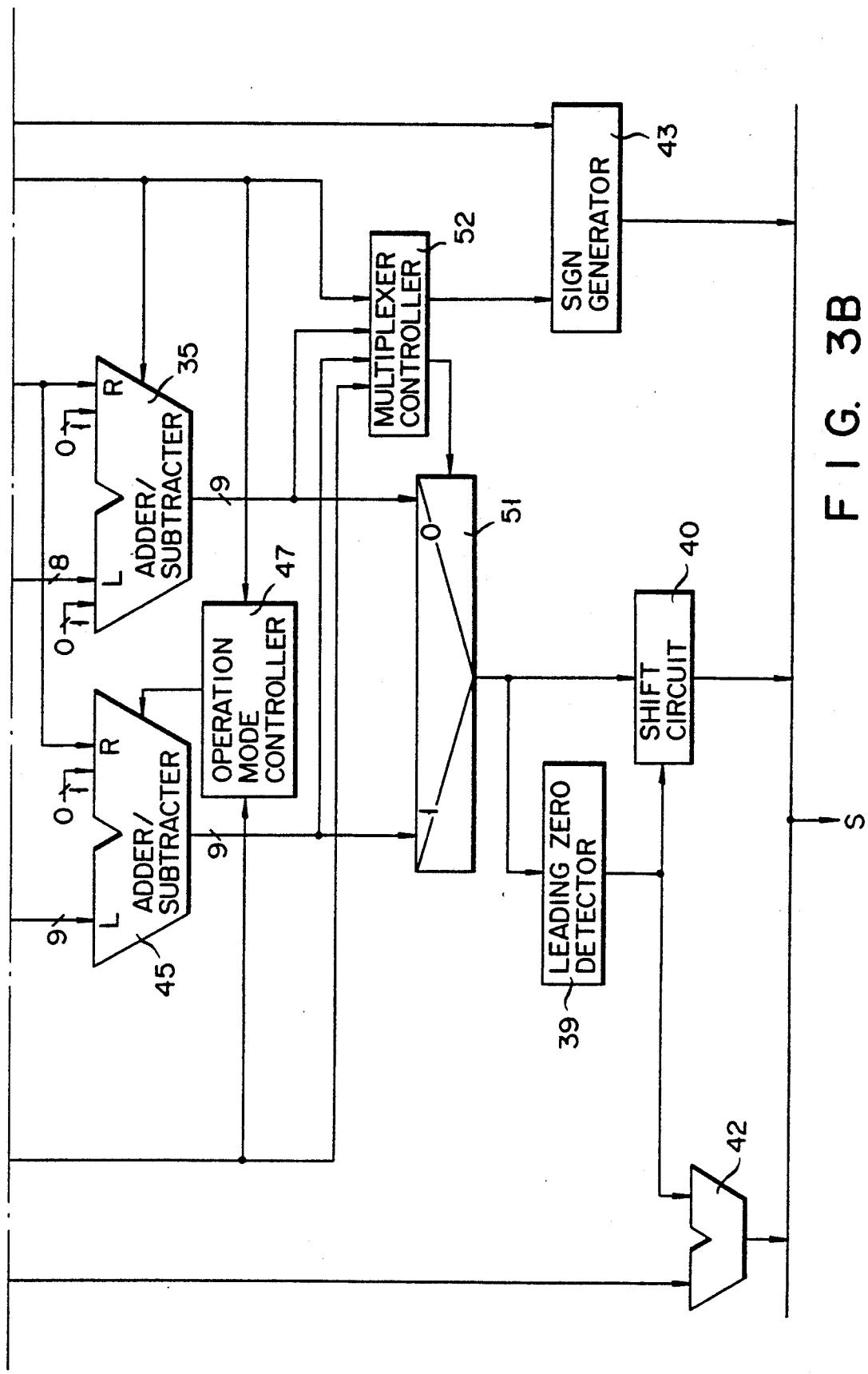

An arrangement of the apparatus will be described below with reference to FIGS. 3A and 3B. Referring to FIGS. 3A and 3B, an exponent difference detector 31 comprises a subtracter and a zero detector (neither of which are shown) and receives normalized operation data A and B in unit of digit, i.e., four bits. The subtracter operates a difference between exponential parts of the data A and B and generates exponential part difference data 31a representing the difference, and a signal 31b representing that the exponential part of the data A is equal to or larger than the exponential part of the data B. On the basis of the exponential part difference data, the zero detector generates a signal 31c representing whether the exponential parts of the data A and B are equal to each other. When the exponential part of the data A is equal to or larger than that of the data B, the signal 31b is at logic "1". Otherwise, the signal 31b is at logic "0". When the exponential parts of the data A and B are equal to each other, the signal 31c is at logic "1". In this embodiment, a carry output from the subtracter is used as the signal 31b. The data 31a is supplied to a round processing data generating section 48 and a shift circuit 34. The signal 31b is supplied to multiplexers 32 and 41 and an operation mode setting section 36 directly, and is inverted and then supplied to a multiplexer 33. The signal 31c is supplied to a round processing data generating section 46, an operation mode controller 47, and a multiplexer controller 52.

Each of multiplexers 32 and 33 receives the mantissa part of the data A at its 1-side input and the mantissa part of the data B at its 0-side input. In accordance with the signal 31b from the detector 31 as a selection control signal, the multiplexer 32 selects one of the mantissa parts of the data A and B. That is, when the signal 31b is at logic "1", the multiplexer 32 selects the mantissa part of the data A. When the signal 31b is at logic "0", the multiplexer 32 selects the mantissa part of the data B. The data (six digits) selected by the multiplexer 32 is supplied to round processing data generating sections 46 and 50 and a multiplexer 49. In accordance with an inverted signal the signal 31b as a selection control signal, the multiplexer 33 selects one of the mantissa parts of the data A and B. That is, when the signal 31b is at logic "1", the multiplexer 33 selects the mantissa part of the data B. When the signal 31b is at logic "0", the multiplexer 33 selects the mantissa part of the data A. The mantissa part (six digits) selected by the multiplexer 33 is supplied to a shift circuit 34.

In accordance with an input operation instruction and the input operation data A and B, the operation mode setting section 36 determines an operation mode, i.e., an addition mode or subtraction mode. In addition, the section 36 generates an expection sign of an operation result in accordance with the input operation instruction, the input data A and B, and the signal 31b from the exponent difference detector 31. The expection sign is output to a sign generator 43.

The shift circuit 34 shifts the mantissa part supplied from the multiplexer 33 to the right by the number of digits indicated by the exponential part difference data 31a supplied from the exponent difference detector 31. As a result, the mantissa part from the multiplexer 33, i.e., the mantissa part of the data A or B having a smaller exponential part is shifted with respect to the mantissa part of the data B or A having a larger exponential part. At this time, the shift circuit 34 adds, for example, two upper digits of the shifted-out digits as guard digits (the seventh and eighth digits) to a lower portion of the 6-digit mantissa part after shifting, thereby forming an 8-digit mantissa part. Apparently, the seventh and eighth digits represent OOH when no shifting is performed, and the eighth digit represents OH when shifting is performed by one digit. The 8-digit mantissa part shifted by the shift circuit 34 is supplied as first-to-eighth-digit data to the R-side input of each of 9-digit adder/subtracters 35 and 45 for a mantissa part operation.

The 6-digit mantissa part of the data A or B, having a larger exponential part (if the exponential parts are equal to each other, the mantissa part of the data A), output from the multiplexer 32, is supplied to the round processing data generating section 46. In accordance with the operation mode determined by the operation mode setting section 36 and the signal 31c from the exponent difference detector 31, the round processing data generating section 46 adds two guard digits OOH (the seventh and eighth digits) to a lower portion of the 6-digit mantissa part selected by the multiplexer 32 when the subtraction mode is set and the signal 31c at logic "1", i.e., when the difference between the exponential parts of the data A and B is 0. Otherwise, the generating section 46 adds two guard digits 8OH as the seventh and eighth digits in which only the most significant bit (MSB) of four bits of the seventh digits is at logic "1", to the lower portion of the 6-digit mantissa part. The 8-digit data generated by the round processing data generating section 46 is supplied as the first to eighth digits to the L-side input of the adder/subtracter 35.

The round processing data generating section 48 receives the data 31a from the detector 31. In accordance with the difference between the exponential parts of the data A and B, the generating section 48 generates two guard digits used in the operation performed by the adder/subtracter 45. For this purpose, when the exponential part difference between the data A and B is two or more, the generating section 48 generates two guard digits O8H for the rounding operation of the eighth digit. When the exponential part difference is 0 or 1, the generating section 48 generates two guard digits OOH. The generating section 48 supplies the generated digits to the 1-side input of the multiplexer 49. The round processing data generating section 50 adds "1" to the MSB of the sixth digit of the 6-digit data selected by the multiplexer 32 and outputs 7-digit data expanded to an upper portion by one digit in consideration of a carry output, to the 0-side input of the multiplexer 49.

The multiplexer 49 receives the two guard digits from the round processing data generating section 48 as the seventh and eighth digits of the 9-digit at 1-side input and receives the mantissa part selected by the multiplexer 32 as the first to sixth digits thereof. The 0th digit of the 1-side input is fixed to OH. The multiplexer 49 receives data from the round processing data generating section 50 as the 0th to sixth digits of the 0-side input. The seventh and eighth digits of the 0-side input are fixed to OOH. In accordance with the operation mode determined by the operation mode setting section 36, the multiplexer 49 supplies the 1- or 0-side input to the L-side input of the adder/subtracter 45. That is, when the subtraction mode is set by the operation mode setting section 36, the multiplexer 49 selects the 1-side input in order for the adder/subtracter 45 to perform an operation with rounding of the eighth digit when the exponential part difference is 2 or more or an operation without rounding when the exponential part difference is 0 or 1. When the addition mode is set, the multiplexer 49 selects the 0-side input in order for the adder/subtracter 45 to perform an operation with rounding of the sixth digit. The selection output data from the multiplexer 49 is supplied to the L-side input of the adder/subtracter 45.

In accordance with the operation mode set by the operation mode setting section 36 and the signal 31c from the exponential part difference detector 31, the operation mode controller 47 controls the operation by the adder/subtracter 45. That is, when the signal 31c from the detector 31 indicates that the exponential part difference between the data A and B is not 0, the operation mode controller 47 controls the adder/subtracter 45 to execute an operation (L+R) with the rounding operation of the sixth digit if the operation addition mode is set by the operation mode setting section 36 and to execute an operation (R−L) or (L−R) with the rounding operation of the eighth digit if the subtraction mode is set. The operation mode controller 47 controls the adder/subtracter 45 to execute an operation (R−L) with the rounding operation of the eighth digit, i.e., an operation (R−L) without the rounding operation in the subtracter mode when the signal 31c from the detector 31 indicates that the exponential part difference between the data A and B is O, and to execute an operation (L−R) with the round operation of the eight digit the subtraction mode when the exponential part difference between data A and B is 1 or more.

The adder/subtracters 35 and 45 simultaneously perform two operations expected including rounding. The 0th digit of each of the L- and R-side inputs of the adder/subtracter 35 is fixed to OH. The adder/subtracter 35 receives the output data from the shift circuit 34 as the first to eighth digits of the R-side input and the output data from the round processing data generating section 46 a the first to eighth digits of the L-side input. In accordance with the operation mode set by the operation mode setting section 36, the adder/subtracter 35 performs an operation including rounding of the seventh digit. That is, except when the subtraction mode is set and the difference between the exponential parts of the data A and B is 0, the adder/subtracter 35 performs an operation (L+R) with rounding of the seventh digit in the addition mode, and an operation (L−R) with rounding of the seventh digit in the subtraction mode. The adder/subtracter 35 performs the operation (L−R)

without rounding only when the subtraction mode is set and the exponential part difference between the data A and B is 0. The adder/subtracter 35 outputs the operation result to the 0-side input of a multiplexer 51 and the multiplexer controller 52.

The 0th digit of the R-side input of the adder/subtracter 45 is fixed to OH. The adder/subtracter 45 receives the output data from the shift circuit 34 as the first to eighth digits of the R-side input and the output data from the multiplexer 49 as the 0th to eighth digits of the L-side input. Under the control of the controller 47, the adder/subtracter 45 performs the same operation as the adder/subtracter 35 when the exponential part difference between the data A and B is not 0. The adder/subtracter 45 performs an operation (R−L), when the exponential part difference is 0 and the subtraction mode is set while the adder/subtracter 35 performs an operation (L−R), when the exponential part difference is not 0 and the subtraction mode is set, since a magnitude relationship between the mantissa parts cannot be determined until subtraction is performed. Therefore, the adder/subtracters 35 and 45 simultaneously perform the operations (L−R) and (R−L), respectively, and a positive one of the operation results is selected. That is, when the subtraction mode is selected by the operation mode setting section 36, the operation (R−L) without rounding, and the operation (L−R) with rounding of the eighth digit are performed if the exponential part difference between the data A and B is 0 and 1, 2 or more, respectively. The operations (L−R) with rounding of the eight when the exponential part difference is 1 corresponds to the operation (L−R) without rounding. When the addition mode is set by the operation mode setting section 36, the operation (L+R) with rounding of the sixth digit is performed. The operation result from the adder/ subtracter 45 is supplied to the 1-side input of the multiplexer 51 and the multiplexer controller 52.

The multiplexer controller 52 also receives the signal 31c from the exponent difference detector 31. The controller 52 controls the multiplexer 51 in accordance with the operation mode set by the operation mode setting section 36, the operation results from the adder/subtracters 35 and 45 and the signal 31c representing whether the exponential part difference between the data A and B is 0. In addition to the control of the multiplexer 51, the multiplexer controller 52 detects the positive/negative polarity of the output from the adder/subtracter 35 when the subtraction mode is set and the signal 31c is at logic "1" (i.e., the exponential part difference between the data A and B is 0). This positive/negative polarity detection result is supplied to the sign generator 43 together with the expection sign output from the operation mode setting section 36.

The sign generator 45 generates a sign of the operation result on the basis of the expection sign from the operation mode setting section 36 and the positive/negative polarity detection result from the multiplexer controller 52. When the positive/negative polarity detection result indicates the positive polarity (including zero), i.e., when the subtraction mode is set, the exponential part difference is 0, and the operation result of the adder/subtracter 35 is positive, the expection sign from the operation mode setting sec section 36 is directly output as a sign of the operation result. When the positive/negative polarity detection result indicates the negative polarity, inverted data of the expection sign from the section 36 is output as a sign of the operation result.

The multiplexer 51 receives the operation results from the adder/subtracters 45 and 35 at its 1-and 0-side terminals, respectively. In accordance with a control signal from the multiplexer controller 52, the multiplexer 51 supplies one of the operation results from the adder/subtracters 45 and 35 to a leading zero detector 39 and a shift circuit 40. The leading zero detector 39 detects the number of leading zero digits of the output data from the multiplexer 51 and outputs the detection result to a subtracter 42 and the shift circuit 40. The shift circuit 40 shifts the output data from the multiplexer 51 to the left by the number of leading zero digits supplied from the detector 39, i.e., shifts a decimal point to the right to a position at the left side of a numeral other than 0, and outputs a normalized mantissa part of the operation result.

In addition to the exponent difference detector 31, the exponential parts of the input data A and B are supplied to the 1- and 0-side terminals of the multiplexer 41. In accordance with the signal 31b from the detector 31, the multiplexer 41 selects a larger one of the exponential parts of the data A and B. The exponential part selected by the multiplexer 41 is supplied to one input terminal of the subtracter 42 for exponential part correction. The number of leading zero digits from the leading zero detector 39 is supplied to the other input terminal of the subtracter 42. The subtracter 42 subtracts the number of leading zero digits, i.e., the number of digits shifted to the left for mantissa part normalization by the shift circuit 40 from the larger exponential part selected by the multiplexer 41, thereby operating an exponential part of the operation result.

An operation of the floating-point representation data adding/subtracting apparatus of the present invention will be described below.

Figures 2, 4:
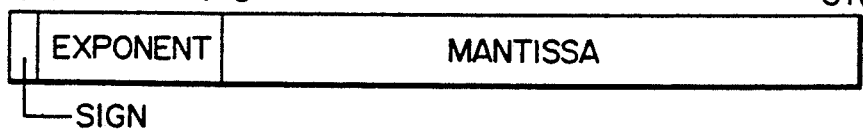
FIG. 2 is a schematic view showing a format of floating-point representation data.
FIG. 4 is a table for explaining a logic of an operation mode setting section 36 shown in FIG. 2.

In accordance with the signs of the input data A and B and the operation instruction M, the operation mode, i.e., the addition mode or the subtraction mode is selected. FIG. 4 shows conditions of setting the operation mode. For example, when both the data A and B are positive and the operation instruction is an addition instruction, the addition mode is set as the operation mode. When the data A is negative, the data B is positive or 0, and the operation instruction is the subtraction instruction, the addition mode is set.

Rounding must be performed upon execution of an operation according to the operation mode. The type and adding conditions of guard digits will be described below with reference to FIGS. 5A to 5H. When data is single-precision data (having six digits from the first to sixth digits) and has two guard digits (in this case, the seventh and eighth digits), a digit position to be rounded is as follows for each of <addition mode> and <subtraction mode>. In this case, assume that the data A and B are normalized data.

<Addition Mode>

In the addition mode, the 0th digit of the operation result is 1 or 0 in accordance with the presence/absence of a carry upon addition, as shown in FIGS. 5A and 5B. Therefore, digit and bit positions to be rounded are as follows:

0th digit=0: the MSB of four bits of the seventh digit
0th digit=1: the MSB of four bits of the sixth digit.

Therefore, an addition operation including rounding of the seventh digit and an addition operation including rounding of the sixth digit are simultaneously and respectively executed in the adder/subtracters 35 and 45, and high-speed processing can be performed by selecting one of the operation results.

<Subtraction Mode>

1) When exponential parts of data A and B are equal

As shown in FIGS. 5C and 5D, the 0th digit of the operation result is 0 (borrow). Therefore, processing of shifting digits of a mantissa part need not be performed. In addition, since the seventh and eighth digits are OH, rounding is not necessary (must be inhibited).

2) When exponential part difference between data A and B is 1

As shown in FIGS. 5E and 5F, the 0th digit of the operation result is 0 (borrow). Therefore, there is a possibility of leading zero at the first to sixth digits of the operation result. In addition, since digits of a mantissa part from the shift circuit 34 are shifted by one digit, the eighth digit is OH. For this reason, digit and bit positions to be rounded are as follows:

1st digit=0: no rounding required (rounding inhibited)
1st digit≠0: the MSB of four bits of the seventh digit 3) When exponential part difference between data A and B is 2 or more As shown in FIGS. 5G and 5H, the 0th digit of the operation result is 0 (borrow). Therefore, only the first digit of the operation result has a possibility of leading zero. For this reason, digit and bit positions to be rounded are as follows:

1st digit=0: the MSB of four bits of the eighth digit
1st digit≠0: the MSB of four bits of the seventh digit As described above, in the subtraction mode, when no exponential part difference is present between the data A and B, no rounding is performed. When a difference is present, an operation including rounding of the seventh digit is executed by the adder/subtracter 35. Also, an operation including rounding of the eighth digit or an operation without rounding are simultaneously executed by the adder/subtracter 45. High-speed processing can be performed by selecting one of the operation results.

In the following description, assume that the exponential part of the data A is larger than that of the data B.

The operation data A and B are supplied to the exponent difference detector 31. The detector 31 operates a difference between the exponential parts of the data A and B and generates the exponential part difference data 31a representing the difference. In addition, which of the exponential parts is larger is checked on the basis of the difference. In this embodiment, since the exponential part of the data A is larger than that of the data B, the signal 31b of logic "1" is generated. This signal is equally generated when the exponential parts of the data A and B are equal to each other. Since the signal 31c of logic "1" is generated when the difference is zero, the signal 31C is currently at logic "0".

The multiplexer 32 selects the mantissa part of the data A in accordance with the signal 31b from the detector 31, and the multiplexer 33 selects the mantissa part of the data B in accordance with an inverted signal $\overline{31b}$ of the signal 31b. The shift circuit 34 shifts the mantissa part of the data B to the right by the number of digits represented by the data 31a from the detector 31, i.e., by the exponential part difference between the data A and B. In this manner, digits of the mantissa part of the data B are shifted with respect to that of the data A. In this case, the shift circuit 34 adds two upper digits, for example, of the shifted-out digits to a lower portion of the 6-digit mantissa part after shifting as the seventh and eighth guard digits, thereby forming an 8-digit mantissa part. Apparently, the seventh and eighth digits are OOH when no shifting is performed, and the eighth digit is OH when shifting is performed by one digit. This shifted mantissa part is supplied to the R-side input each of the adder/ subtracters 35 and 45.

In accordance with the operation mode set by the operation mode setting section 36 and the signal 31c from the detector 31, the round processing data generating section 46 adds the guard digits to the 6-digit mantissa part of the data A from the multiplexer 32. In this case, since the subtraction mode is set and the signal 31c is at logic "0", two guard digits 8OH are added. When the subtraction mode is set and the signal 31c is at logic "1", i.e. when the exponential part difference between the data A and B is 0, two guard digits OOH are added to the lower portion of the mantissa part of the data A. The other operations in this case are the same as when the subtraction mode is set and the signal 31c is at logic "0". The 8-digit data A added with the guard digits is supplied to the L-side input of the adder/subtracter 35.

The round processing data generating section 48 generates two guard digits O8H when the exponential part difference between the data A and B is 2 or more. When the exponential part difference is 0 or 1, the generating section 48 generates two guard digits OOH because the adder/subtracter 45 does not perform rounding. The generated two guard digits are supplied to the 1-side input of the multiplexer 49. The round processing data generating section 50 adds "1" to the MSB of the sixth digit of the 6-digit data A selected by the multiplexer 32 and outputs 7-digit data, expanded to an upper portion by one digit in consideration of a carry output, to the 0-side input of the multiplexer 49.

The multiplexer 49 receives the two guard digits from the generating section 48 as the seventh and eighth digits of the 1-side input and the mantissa part selected by the multiplexer 32 as the first to sixth digits thereof. The 0th digit of the 1-side input is fixed to OH. The multiplexer 49 receives the data from the generating section 50 as the 0th to sixth digits of the 0-side input. The seventh and eighth digits of the 0-side input are fixed to OOH. When the addition mode is set, the 0-side input is selected. When the subtraction mode is set, the 1-side input is selected. In accordance with the operation mode, the 1- or 0-side input is supplied to the L-side input of the adder/ subtracter 45.

Figure 1:
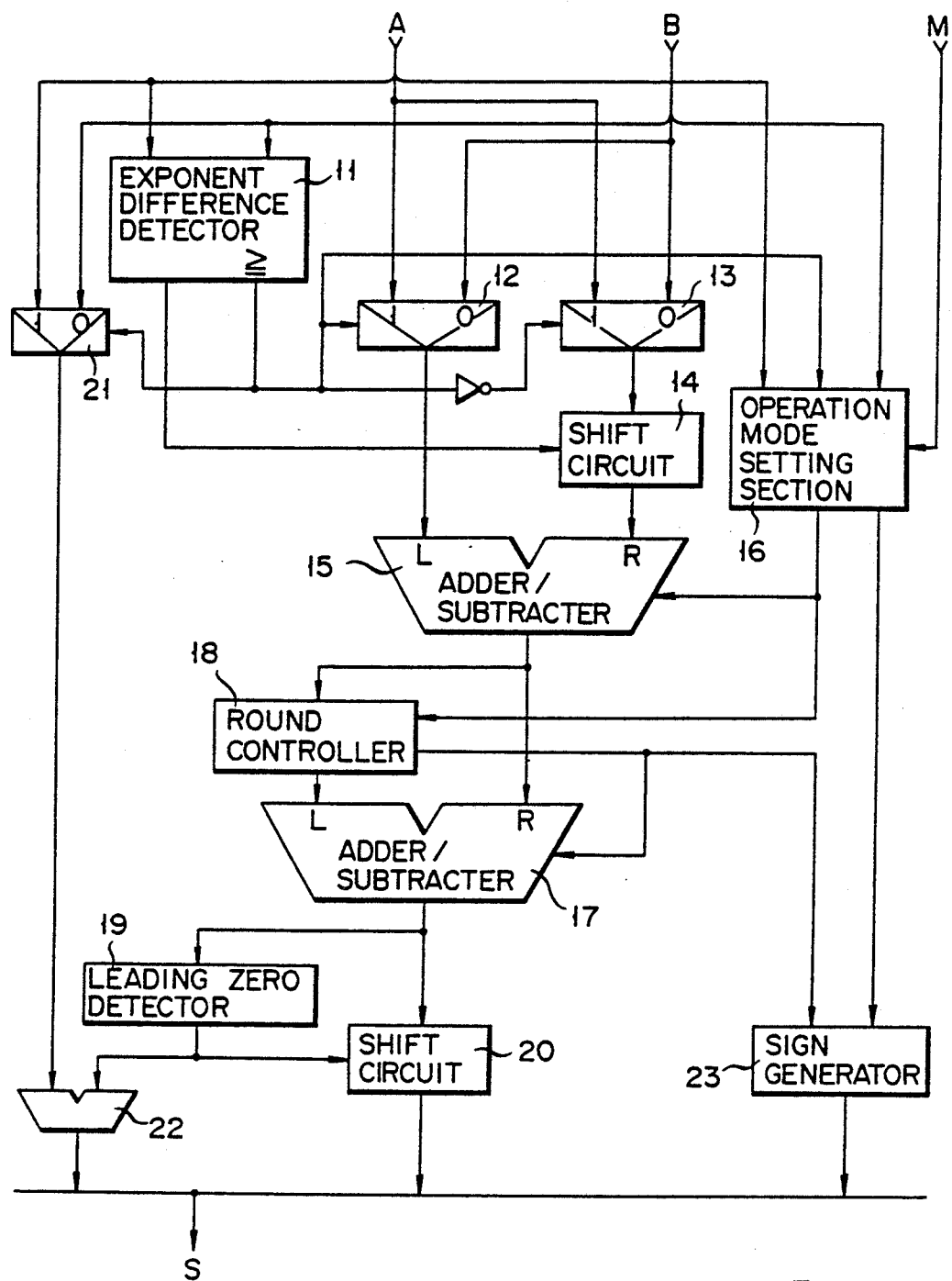
FIG. 1 is a block diagram showing a conventional floating-point representation data adding/subtracting apparatus.

A time required for the operation will be described below. As compared with the conventional floating-point representation data adding/subtracting apparatus shown in FIG. 1, a path of the round processing data generating section 50 and the multiplexer 49 to the adder/ subtracters 35 and 45 for mantissa parts of the present invention corresponding to the adder/subtracter 15 shown in FIG. 1 requires a longest processing time. The processing time, however, is not much different from a processing time of the shift circuit 34 for digit shifting. In addition, in a circuiting following the adder/subtracters 35 and 45, the second adder/subtracter stage 17 is provided in the conventional apparatus. In the present invention, however, only the multiplexer controller 52 and the multiplexer 51 requiring a processing time shorter than that of the adder/subtracter 17 are provided, thereby largely reducing the processing time.

The adder/subtracters 35 and 45 simultaneously execute two operations expected including rounding. The 0th digit of each of the L- and R-side inputs of the adder/subtracters 35 and 45 is fixed to OH. In accordance with the operation mode, the adder/subtracter 35 executes an operation including rounding of the seventh digit between the R- and L-side inputs. When the subtraction mode is set and the exponential part difference is 1, an operation (L−R) with rounding of the seventh digit is performed. When the subtraction mode is set and the exponential part difference between the data A and B is 0, an operation (L−R) without rounding is performed. In the addition mode, an operation (L+R) with rounding of the seventh digit is executed. The operation result is supplied to the multiplexers 51 and the multiplexer controller 52.

The 0th digit of the R-side input of the adder/subtracter 45 is fixed to OH. The operation mode controller 47 controls the operation of the adder/subtracter 45 in accordance with the operation mode and the signal 31c from the detector 31. When the exponential part difference is 1, the signal 31c is at logic "0", and the subtraction mode is set, the operation (L−R) without rounding is executed. When the exponential part difference is 2 or more, the operation (L−R) with rounding of the eighth digit is executed. When the signal 31c is at logic "1" and the subtraction mode is set, an operation (R−L) without rounding is executed. When the addition mode is set, an operation (L+R) with rounding of the sixth digit is executed regardless of the signal 31c. The operation result of the adder/subtracter 45 is supplied to the multiplexer 51 and the multiplexer controller 52.

The multiplexer 51 is controlled by the multiplexer controller 52 in accordance with the operation, mode the operation results of the adder/subtracters 35 and 45, and the signal 31c.

One of the operation results of both the adder/subtracters 35 and 45 is selected by the multiplexer 51 as will be described below.

<Addition Mode>

In the addition mode, the 0th digit of the operation result of the adder/subtracter 35 is checked. That is, when the 0th digit is OH, the operation result of the adder/subtracter 35 is selected. Otherwise, the operation result of the adder/subtracter 45 is selected. That is, when the 0th digit of the operation result of the adder/subtracter 35 is OH, the 6-digit mantissa part as the operation result of the adder/subtracter 35 is obtained by rounding the seventh digit. When the 0th digit is not OH, the 0th to fifth digits rounded at the sixth digit are effective digits. Therefore, the operation result of the adder/subtracter 35 obtained by rounding the sixth digit is effective.

<Subtraction mode>

In the subtraction mode, the 0th and first digits of the operation result of the adder/subtracter 45 are checked. That is, the operation result of the adder/subtracter 45 is selected when the exponential part difference between the data A and B is 0 and the 0th digit is OH or when the exponential part difference between the data A and B is not 0 and the first digit is OH. Otherwise, the operation result of the adder/subtracter 35 is selected. The reason for this is as follows. That is, when the exponential part difference is 0, the adder/subtracter 45 executes the operation (R−L), and the 0th digit of this operation result becomes OH only when R≧L. In this case, therefore, this operation result must be selected.

When the exponential part difference is 1, the adder/subtracter 35 executes the operation (L−R) without rounding as described above. When the first digit of the operation result is OH, mantissa part effective digits appear after the second digit. Therefore, the operation result without rounding must be selected. When the exponential part difference is 2 or more, the adder/subtracter 45 executes the operation (L−R) with rounding of the eighth digit. When the first digit of this operation result is OH, the second to seventh digits are effective. Therefore, the operation result with rounding of the eighth digit must be selected.

The operation result selected by the multiplexer 51 is supplied to the leading zero detector 39 and the shift circuit 40 in accordance with the control signal from the multiplexer controller 52. The detector 39 detects the number of leading zero digits of the output data from the multiplexer 51 and outputs the detected number to the subtracter 42 and the shifting circuit 40. The shift circuit 40 shifts the output data from the multiplexer 51 to the left by the number of leading zero digits, i.e. shifts a decimal point to the right at the left side of a numeral other than 0, thereby outputting a normalized mantissa part of the operation result.

In accordance with the signal 31b from the exponent difference detector 31, the multiplexer 41 selects a larger one of the exponential parts of the input data A and B supplied to its 1- and 0-side inputs in addition to the detector 31. The subtracter 42 subtracts the number of leading zero digits supplied from the leading zero detector 39 from the selected exponential part, thereby operating an exponential part of the operation result.

In accordance with the input operation instruction, the input data A and B, and the signal 31b from the detector 31, the operation mode setting section 36 generates and outputs an expection sign of the operation result to the sign generator 43. The multiplexer controller 52 not only controls the multiplexer 51 but also detects the positive/negative polarity of the output from the adder/subtracter 35 when the subtraction mode is set and the signal 31c is at logic "1". The positive/negative polarity detection result is supplied to the sign generator 45 together with the expection sign output from the operation mode setting section 36. The generator 45 generates a sign of the operation result on the basis of the expection sign from the section 36 and the positive/negative polarity detection result from the controller 52. When the positive/negative polarity detection result represents the positive polarity (including zero), i.e., when the subtraction mode is set, the exponential part difference is 0, and the operation result of the adder/subtracter 35 is positive, the expection sign from the section 36 is directly output as a sign of the operation result. When the positive/negative polarity detection result is negative, inverted data of the expection sign from the section 36 is output as a sign of the operation result.

In the above embodiment as described above, the present invention is applied to a single-precision floating-point adding/subtracting apparatus The present invention, however, can be similarly applied to an adding/subtracting apparatus having a different precision, e.g., double precision by only changing a digit position or the like to be rounded (e.g., in the case of double precision, a digit position is obtained by adding 8 to a digit position to be rounded in the case of single precision).

What is claimed is:

1. A floating point representation data adding/subtracting apparatus comprising:

operation mode setting means for setting one of addition and subtraction modes as an operation mode in accordance with first and second operation data and an input operation instruction, each of the first and second operation data being normalized floating-point representation data and having a sign, an exponential part, and a mantissa part, the operation mode being selected in accordance with a magnitude relation between the exponential parts of the first and second operation data and the operation instruction;

first selecting means for selecting the mantissa part of the first operation data as a first mantissa part when the exponential part of the first operation data is equal to or larger than the exponential part of the second operation data;

second selecting means for selecting the mantissa part of the second operation data as a second mantissa part when the exponential part of the first operation data is equal to or larger than the exponential part of the second operation data;

shifting means for shifting the second mantissa part of the second operation data to lower digits with respect to a floating-point in accordance with a difference between the exponential parts of the first and second operation data, and selectively adding shifted-out digits as first guard digits to the shifted second mantissa part in accordance with the difference to obtain first processing data;

operation mode control means for generating an operation mode control instruction in accordance with the operation mode and the magnitude relation between the exponential parts of the first and second operation data;

first processing data preparing means for adding first logic guard digits as second guard digits to the first mantissa part when the exponential part difference between the first and second operation data is not 0 or the addition mode is set, the logic guard digits which the most significant bit of bits of an nth digit is 1, and zero guard digits to the first mantissa part when the exponential part difference is 0 in the subtraction mode, to obtain second processing data;

second processing data preparing means for adding second logic guard digits as third guard digits to the first mantissa part when the exponential part difference between the first and second operation data is 2 or more in the subtraction mode, the second logic guard digits which the most significant bit of bits of an nth digit is 1, and zero guard digits to the first mantissa part when the exponential part difference is 0 or 1 in the subtraction mode or the addition mode is set, and adding third logic guard digits to a lowermost digit of the first mantissa part in the addition mode, the third logic guard digits which the most significant bit of bits of an nth digit is 1, to obtain third processing data;

first adding/subtracting means for executing a first operation of the plurality of operations on the first and second processing data and selectively executing rounding at a first predetermined digit in accordance with the operation mode;

second adding/subtracting means for executing a second operation of the plurality of operations on the first and third processing data simultaneously with said first adding/subtracting means and selectively executing rounding at a second or third predetermined digit in accordance with the operation mode control instruction; and selecting means for selecting one of results of the plurality of operations as a resultant mantissa part in accordance with the operation mode and the magnitude relation between the exponential parts of the first and second operation data, an operation resultant data of the first and second operation data including a resultant sign, a resultant exponential part, and the resultant mantissa part, and wherein each digit is hexadecimal.

2. An apparatus according to claim 1, wherein said first adding/subtracting means includes means for subtracting the first processing data from the second processing data in the subtraction mode, and executing addition of the first and second processing data in the addition mode, and said second adding/subtracting means includes means for subtracting the third processing data from the first processing data when the exponential part difference between the first and second operation data is 0, subtracting the first processing data from the third processing data when the exponential part difference is 1 or more, in the subtraction mode, and executing addition of the first and third processing data in the addition mode.

3. An apparatus according to claim 1, wherein said selecting means includes:

means for selecting, in the addition mode, one of results of the first and second operations as the resultant mantissa part in accordance with an operation result of said first adding/subtracting means, and in the subtraction mode, selecting one of the results of the first and second operations as the resultant mantissa part in accordance with an operation result of said second adding/subtracting means; and means for selecting, as the resultant mantissa, in the addition mode, the operation result from said first adding/subtracting means when a 0th digit of the operation result from said first adding/subtracting means is 0, and the operation result from said second adding/subtracting means is not 0, and in the subtraction mode, selecting as the resultant mantissa the operation result from said second adding/subtracting means when the exponential part difference is 0 and a 0th digit of the operation result from said second adding/subtracting means is 0 or when the exponential part difference is not 0 and a first digit of the operation result from said second adding/subtracting means is 0, and otherwise the operation result from said first adding/subtracting means.

4. A method of adding/subtracting floating-point representation data, the method comprising the steps of:

setting one of the addition and subtraction modes as an operation mode in accordance with first and second operation data and an operation instruction, each of the first and second operation data being normalized floating-point representation data having a sign, an exponential part, and a mantissa part, the operation mode being selected in accordance with a magnitude relation between the exponential parts of the first and second operation data and the operation instruction;

selecting the mantissa part of the first operation data as a first mantissa part when the exponential part of the first operation data is equal to or larger than the exponential part of the second operation data;

selecting the mantissa part of the second operation data as a second mantissa part when the exponential part of the first operation data is equal to or larger than the exponential part of the second operation data;

shifting the second mantissa part of the second operation data to lower digits with respect to a floating-point in accordance with an exponential part difference between the first and second operation data, and adding shifted-out digits as the first guard digits to the shifted second mantissa part, to obtain first processing data;

generating an operation mode control instruction in accordance with the magnitude relation between the exponential parts of the first and second operation data and the operation mode;

adding first logic guard digits as a second guard digits to the first mantissa part in the subtraction mode when the exponential part difference between the first and second operation data is not 0 or the addition mode is set, the first logic guard digits which the most significant bit of bits of an nth digit is 1, and zero guard digits as the second guard digits to the first mantissa part when the exponential part difference is 0 in the subtraction mode, to obtain second processing data;

adding second logic guard digits a third guard digits to the first mantissa part when the exponential part difference between the first and second operation data is 0 or 1 in the subtraction mode, the second logic guard digits which the most significant bit of bits is an nth digit is 1, and zero guard digits as the third guard digits to the first mantissa part when the exponential part difference is 0 or 1 in the subtraction mode or in the addition mode, and adding third logic guard digits to a lowermost digit of the first mantissa part in the addition mode, the third logic guard digits which the most significant bit of bits an nth digit is 1 to obtain third processing data;

executing a first addition/subtraction operation of the plurality of operations on the first and second processing data and executing rounding at a first predetermined digit in accordance with the operation mode;

executing, simultaneously with the first addition/subtraction operation, a second addition/subtraction operation of the plurality of operations on the first and third processing data and executing rounding at a second or third predetermined digit in accordance with the operation mode control instruction; and executing first selection of selecting one of a plurality of expected mantissa parts as a resultant mantissa part in accordance with the operation mode and the magnitude relation between the exponential parts of the first and second operation data, an operation result of the first and second operation data having a resultant sign, a resultant exponential part, and a resultant mantissa part.

5. A method according to claim 10, wherein said first addition/subtraction operation executing step includes subtracting the first processing data from the second processing data in the subtraction mode, and executing addition of the first and second processing data in the addition mode, and said second addition/subtraction operation executing step includes subtracting, the in subtraction mode, the third processing data from the first processing data when the exponential part difference between the first and second operation data is 0, subtracting the first processing data from the third processing data when the exponential part difference is 1 or more, and in the addition mode, executing addition of the first and third processing data.

6. A method according to claim 4, wherein said first selection step induces selecting, in the addition mode, one of results of the first and second addition/subtraction operations as the resultant mantissa part in accordance with an operation result of the first addition/subtraction, and in the subtraction mode, one of the results of the first and second addition/subtraction operations as the resultant mantissa part in accordance with the exponential part difference and an operation result of the second addition/subtraction operation, and said resultant mantissa part selecting step includes selecting as the resultant mantissa, in the addition mode, the operation result of the first addition/subtraction operation when a 0th digit of the operation result of the first addition/subtraction operation is 0, and the operation result of the second addition/subtraction operation when the 0th digit of the operation result of the first addition/subtraction operation is to 0 and in the subtraction mode, selecting as the resultant mantissa the operation result of the second addition/subtraction when the exponential part difference is 0 and the 0th digit of the operation result of the second addition/subtraction operation is 0 and a first digit of the operation result of the second addition/subtraction operation is 0, and otherwise the operation result of the first addition/subtraction.

* * * * *